Aug. 27, 1963     C. WYLE ETAL     3,101,832
UNSCRAMBLER AND ERECTOR FOR ARTICLES SUCH AS PLASTIC BOTTLES
Filed April 7, 1961     4 Sheets-Sheet 1

INVENTORS
CHARLES WYLE
FORREST W. HYDE

BY Feller, McCormick, Paulding & Huber
ATTORNEYS

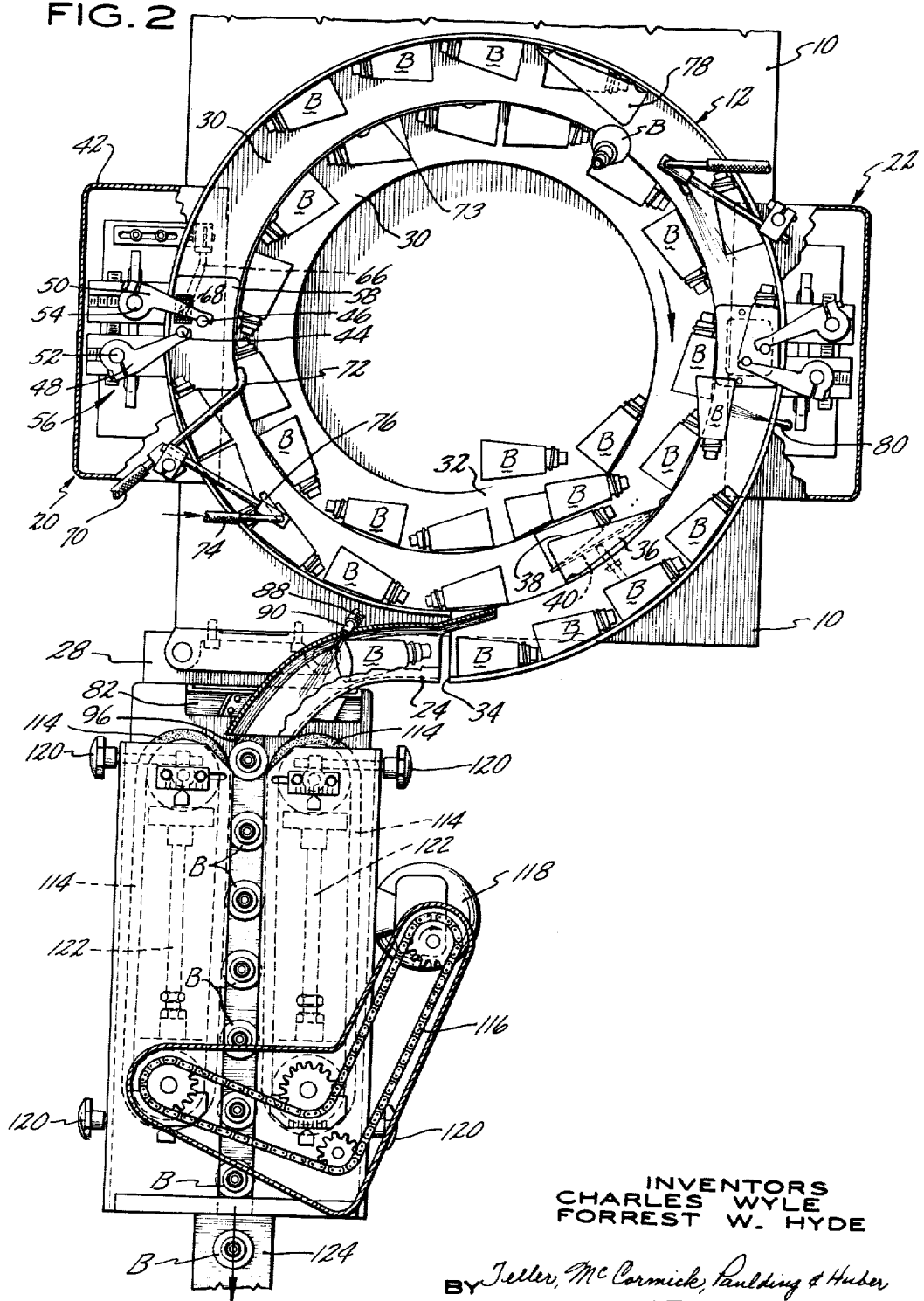

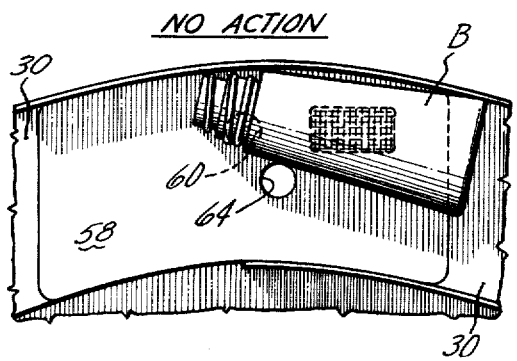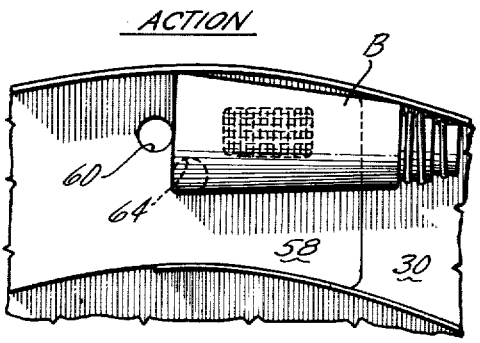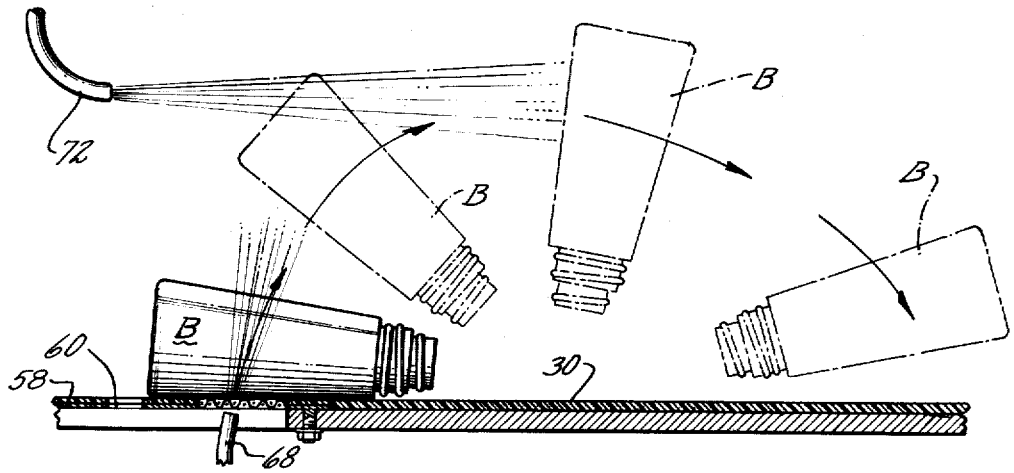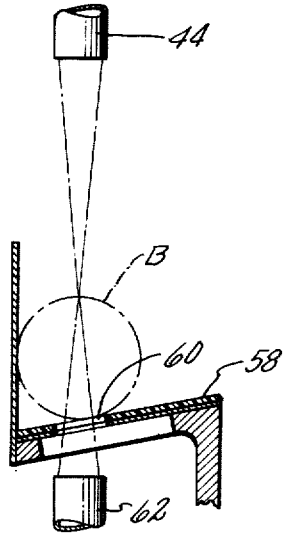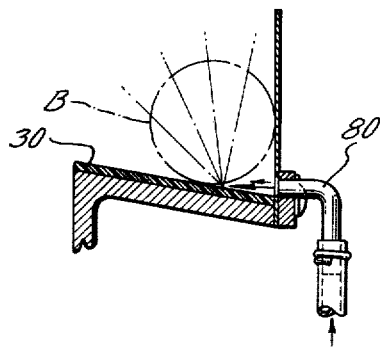

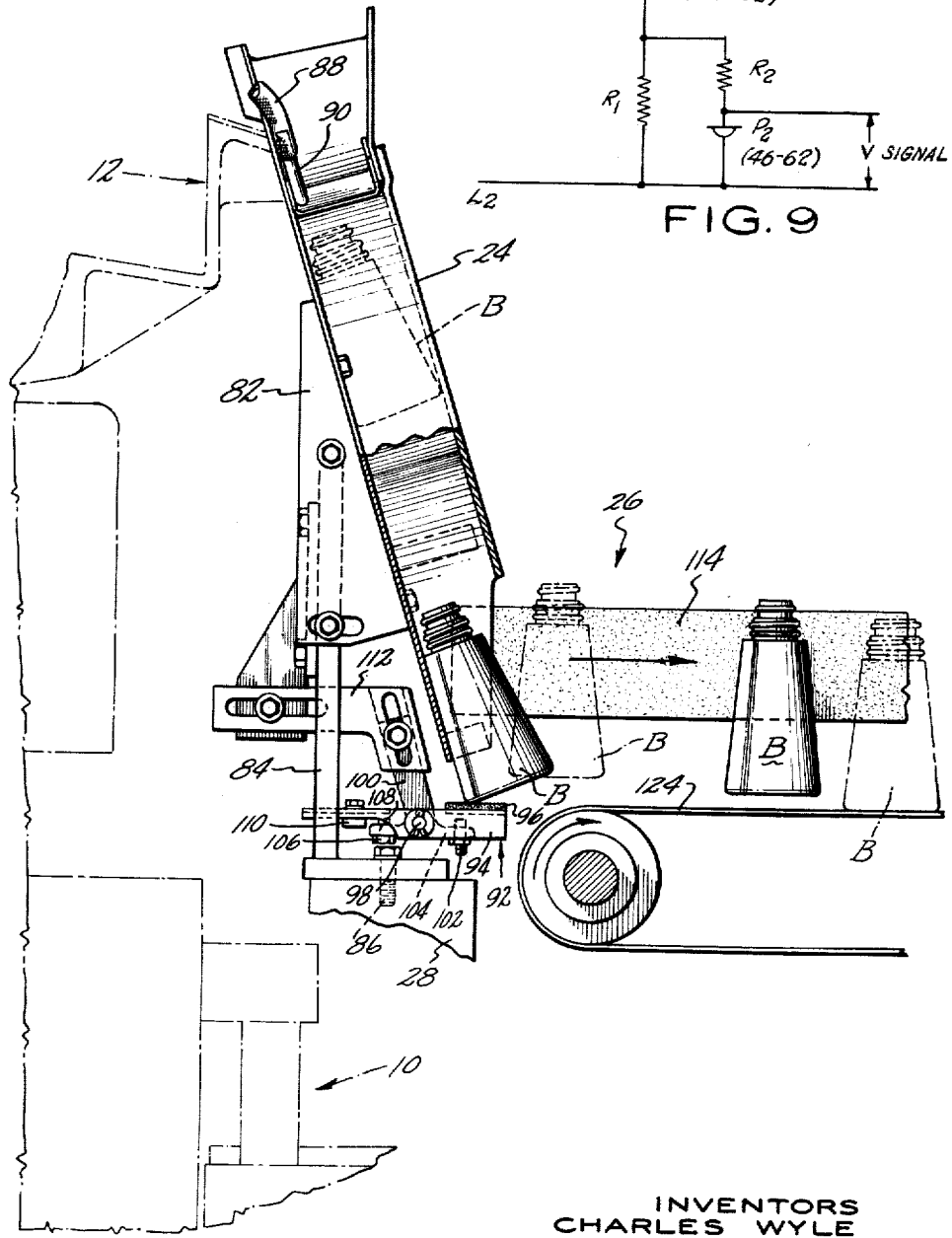

United States Patent Office 3,101,832
Patented Aug. 27, 1963

3,101,832
UNSCRAMBLER AND ERECTOR FOR ARTICLES
SUCH AS PLASTIC BOTTLES
Charles Wyle, Bloomfield, and Forrest W. Hyde, Avon,
Conn., assignors to Emhart Manufacturing Company,
Hartford, Conn., a corporation of Delaware
Filed Apr. 7, 1961, Ser. No. 101,451
4 Claims. (Cl. 198—33)

This invention relates to an apparatus for unscrambling and orienting articles which are in a random group and for then erecting them, bottom end down, for single file transportation.

The invention has particular application to the handling of relatively lightweight articles which, in a production operation, must be oriented and erected at a high rate of speed. For example, apparatus provided in keeping with the present invention may be used to great advantage in unscrambling empty plastic bottles and erecting them on a conveyor which transports them to a machine for filling and capping. For purposes of illustration, the invention will be described as incorporated in apparatus adapted for this particular purpose, but it should be understood that the invention is applicable to the construction of apparatus for handling articles other than plastic bottles.

As will be described in greater detail hereinafter, apparatus provided in accordance with the present invention includes a bowl into which the empty plastic bottles are dumped in random order. The bowl is provided with a spiral track starting from the bottom thereof and up which the bottles climb when the bowl is vibrated. This spiral track is at the periphery of the bowl and means are provided to engage the bottles moving therealong to assure that they will advance on the track in end to end relationship.

It is an important feature of the invention that two lightbeam-photocell discriminator units are associated with the vibratory bowl and the spiral track therein to sense the endwise orientation of the bottles as they advance along the track. It is desired to have the bottles advance bottom end first, and each of the aforesaid discriminator units will sense a departure from the desired endwise orientation of the bottles. If a bottle passes the first of these discriminator units top end or neck end first, means will be actuated to reverse the endwise orientation of the bottle, this means preferably comprising air nozzle means directing air against the bottle to flip it over.

Then, if any bottle is advancing top end or neck end first past the second of the discriminator units, means is actuated thereby to remove the improperly oriented bottle from the track and return it to the bottom of the vibratory bowl. The preferred removal means comprises air nozzle means directed against the improperly arranged bottle to blow it from the track. Thus, the second discriminator unit acts as a check on the successful operation of the first such unit.

When the bottles reach the end of the spiral track, they enter the open top end of a chute which permits them to fall and which directs their fall onto a resilient platform which is supported adjacent the open bottom end of the chute. This platform, of course, receives the falling bottles bottom end down and it serves to dampen and control the bounce of each such bottle. The purpose of this control is to provide assurance that the bottles can be engaged and caught by means that will hold them in an erect position and transport them away from the bottom end of the chute. The means for catching the bottles preferably comprises a pair of endless belts which are arranged substantially parallel to each other to turn on substantially vertical axes. The bounced bottles are caught between the moving belts and are carried thereby in single file erect order and then deposited thereby on a conveyor which continues to move the erect bottles away in single file.

It should be understood that there may be reason for advancing the bottles top or neck end first, and the discriminator units can be adapted to sense a departure from such endwise orientation. Therefore, the described advance of the bottles bottom end first is to be considered as merely exemplary.

From the foregoing general description, it will be rather apparent that it is the general object of the invention to provide an automatically operable apparatus capable of unscrambling or orienting articles in a random group and then erecting them on a conveyor or the like so that the articles can be moved along at the relatively high speed necessary for mass production operation.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 2 is a top plan view of the interconnected vibratory bowl, chute, and conveyor shown in FIG. 1, with parts thereof shown in horizontal section to reveal details of construction;

FIG. 3 is a plan view of a fragment of the spiral track within the vibratory bowl showing the part thereof at a discriminator unit and showing a bottle passing therealong in proper or desired endwise orientation;

FIG. 4 is a view similar to FIG. 3 but it shows a bottle passing along in improper endwise orientation;

FIG. 5 is a schematic view illustrating the manner in which a bottle is turned end for end into proper endwise orientation;

FIG. 6 is a transverse sectional view of the track at a discriminator unit and it shows the arrangement of the lightbeam source and associated photocell;

FIG. 7 is a transverse sectional view of the track at the location where an air nozzle is located to remove an improperly oriented bottle from the track;

FIG. 8 is a vertical view, partly in section, of the chute through which the bottles fall and the associated resilient platform which dampens their bounce; and FIG. 9 is a schematic wiring diagram of the discriminator unit employed.

Figure 1:
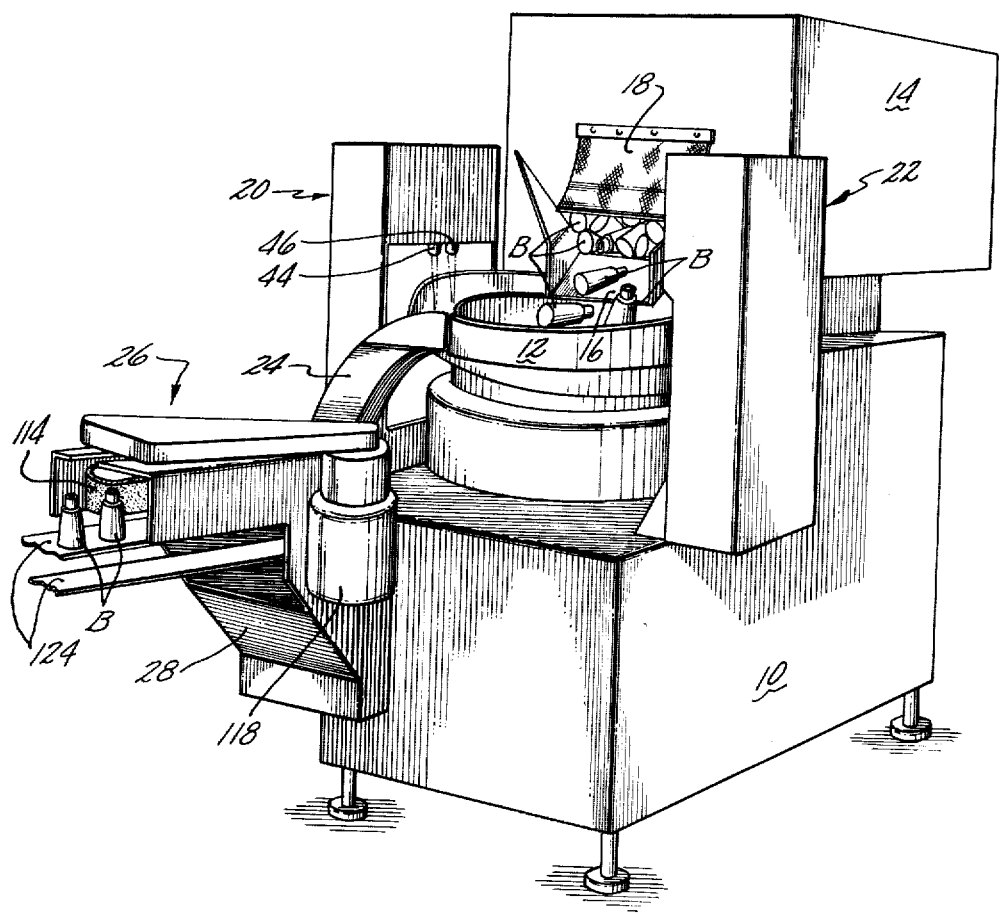
FIG. 1 is a perspective view of the aforedescribed apparatus provided in accordance with the present invention and particularly adapted to unscramble and erect plastic bottles.

Referring now to FIG. 1 in greater detail, it is to be observed that the elements of the apparatus provided in accordance with the present invention are combined in a relatively compact unitary structure. This structure includes a cabinet-like base 10 which supports the vibratory bowl 12 into which the bottles B, B or other articles are to be dumped for unscrambling. The electric motor and other means employed to vibrate the bowl 12 are located within the cabinet-like base 10, and since these devices are well known and do not contribute to the present invention, they have not been shown.

The cabinet-like base 10 also supports a feed hopper 14 into which a supply of the bottles or other articles can be dumped for feeding into the bowl 12. It will be noted that the hopper 14 is provided with an opening and a feed trough 16 which feeds the bottles B, B into the center portion of the bowl 12. A gate 18 is provided at the hopper feed opening and this or other means can be either manually or automatically controlled to control the rate of feed of the bottles from the hopper to the bowl.

The base 10 also supports a first discriminator unit indicated generally at 20 and a second discriminator unit 22 adjacent the bowl 12. The said discriminator units are preferably located in diametrically opposed positions with respect to the vibratory bowl.

The chute 24 which receives the bottles bottom end first from the bowl 12 is also supported by the cabinet-like base 10 and so is the mechanism which is indicated generally at 26 and which catches the erect bottles at the end of the chute and transports them therefrom. This last mentioned mechanism is supported forwardly of the base 10 on bracket means 28 secured thereto.

Turning now to a more specific description of the bowl 12, and with reference to FIG. 2, it will be noted that the said bowl is open at the top and has a thin side wall and that the spiral track 30 formed therein to extend upwardly from the bottom thereof is disposed adjacent the said side wall. Further, the said track rises to the top of the bowl 12 in convolutions of increasing diameter. As shown, the said track completes two convolutions from its starting point 32 at the bottom of the bowl to its end 34 at the top of the bowl. When the bowl 12 is vibrated in accordance with known techniques and at a selected frequency, the random group of bottles B, B in the bottom of the bowl become oriented and start to climb the track 30 in end to end relationship. As the bottles creep or climb along the track upwardly, they engage the peripheral or side wall of the helically shaped bowl 12. The bottles are caused to engage the said side wall because the track 30, as viewed in cross-section (see FIGS. 6 and 7), is sloped downwardly and outwardly toward the side wall.

The cross-sectional width of the track is sufficient to accommodate the width or diameter of the plastic bottles B,B at their widest part with room to spare. Therefore, it is possible that initially there may be more than a single file of bottles climbing the track. That is, there may be one or more bottles climbing the track in side-by-side relationship with other bottles proceeding therealong in single file, end to end relationship. Since it is desirable to have the bottles proceed in single file order and in end to end relationship, means are employed in the path of movement of the bottles to assure that only those bottles proceeding in single file order will pass. Such means comprises a plate 36 which is supported by the side wall of the bowl 12 in a generally horizontal plane to extend over the track 30 in one location thereof. The plate 36 is spaced above the floor of the track 30 so that bottles can pass therebelow only if they are resting on their sides. It will be observed that the plate 36 has a tapered edge 38 which is disposed so as to direct any bottles that may be standing on either end inwardly of the bowl and off the track so that such bottles will tumble therefrom and be returned to the bottom of the bowl. A spring 40 is located below the plate 36 and projects into the path of movement of the bottles so as to engage each one moving along the track. This spring 40 thrusts the advancing bottles toward the inner edge of the track but does not push them thereover, if they are progressing in single file order. If any additional bottle is advancing therewith in side-by-side relationship, it is pushed inwardly and off the track to return to the bottom of the bowl. The plate 36 and spring 40 are preferably located in the bowl and over the track 30 so as to be operable on bottles proceeding along the track after the track has turned through nearly one complete convolution.

The bottles passing the said plate and spring are next acted upon by the first discriminator unit 20 which is located along the track approximately one and one-quarter convolutions from the starting point thereof. The elements of the said first discriminator unit are disposed within a housing 42 and include a pair of light-beaming lamps 44 and 46 which are supported over the track 30 in spaced apart relationship on arms 48 and 50, respectively. The arms 48 and 50 are adjustably connected on posts 52 and 54 for pivotal adjustment over the track 30, and the said support posts are preferably mounted on adjustable means indicated generally by the reference numeral 56 which provides for adjustment of the posts and the lamps carried on the arms radially outwardly and inwardly of the track and therealong.

The first discriminator unit 20 also includes an apertured shield 58 which replaces a section of the floor of the track 30 at the first discriminator station. One aperture 60 (FIGS. 3 and 6) in the shield 58 is associated with the light-beaming lamp 44 so that the beam therefrom will be projected through the said opening onto a light sensitive device 62 such as a photocell unit. Another aperture 64 in the shield 58 is associated with the light-beaming lamp 46 so that its beam will be projected therethrough to a similar light sensitive unit.

The details of construction of the light-beaming lamps and light sensitive devices are well known and form no part of the present invention. It is also well known that such devices in combination can be used to actuate various other devices. For example, in the present arrangement, the light sensitive devices 62, 62 are connected in an electrical circuit (to be described) to a relay which when energized opens a solenoid operated valve to air nozzle means.

More specifically, an air line or conduit 66 (FIG. 2) is connected with the aforesaid solenoid operated valve (not shown) and to a nozzle 68 located below an opening in the shield 58 and directed upwardly therethrough. A second air line 70 is also connected to the solenoid operated valve and to a nozzle 72 which is supported over the track 30 at the first discriminator station. As shown in FIG. 5, the adjustable nozzles 68 and 72 are located so that a puff of air from the nozzle 68 directed against a bottle B which is proceeding along the track 30, top end first, will thrust the said bottle upwardly and forwardly. As the bottle is thrust upwardly it enters the air stream produced by the nozzle 72 which continues to turn the said bottle as shown by the broken line position thereof in FIG. 5. Thus, it can be said that the discriminator unit includes means capable of directing force against the bottle on the track to flip it or turn it end for end if it is not proceeding in the desired endwise orientation. An upstanding skirt or shield 73 is provided at the inner periphery of the track 30 adjacent the discriminator unit 20 to prevent flipped bottles from falling into the bowl 12.

The light-beaming lamps 44 and 46, the light shield apertures 60 and 64, and the two light sensitive devices 62, 62 are arranged at the discriminator unit 20 so that they will cause the aforedescribed air blast flow only if a bottle is detected passing the discriminator unit top end first which is the improper endwise orientation. This is shown by FIGS. 3 and 4. In FIG. 3, it will be observed that a bottle proceeding bottom end first, the proper endwise orientation, will interrupt light-beam transmission between the lamp 44 and its associated unit 62 followed by interruption between the lamp 46 and its photo cell device. Then, in continued movement of the bottle, transmission will be restored between the lamp 46 and its associated unit 62 and, finally, transmission will be restored between the lamp 44 and its associated sensitive unit 62. In this sequence of light-beam interruption and restoration, the relay (not shown) connected with the photosensitive units 62, 62 will not be energized and there will be no air blast through the nozzles 68 and 72.

However, if a bottle is advancing improperly, i.e., top end first as shown in FIG. 4, a different sequence of operation will occur. That is, transmission from the lamp 44 to its associated light sensitive unit will be interrupted first followed by interruption of transmission from the lamp 46. Then, however, light transmission will be restored first between the lamp 44 and its photo-sensitive unit, differing from the desired sequence described. When this occurs, the solenoid valve is opened to cause air flow which flips the improperly advancing bottle end for end as described.

A photoelectric control circuit for accomplishing the desired result is incorporated in a commercial unit known as the Autotron Photoelectric Control, Model #–383, but the preferred circuit is shown in FIG. 9. As shown there, the photocell unit $P_1$ is that which is energized for current flow when the light beam is unbroken between the lamp 44 and its light sensitive unit 62; and the photocell device $P_2$ is that which is energized for current flow when the light beam is unbroken between the lamp 46 and its light sensitive unit 62.

Obviously, whenever the cell unit $P_1$ is darkened, there is no current flow and no output voltage signal V to operate the relay and thus the solenoid operated valve. Whenever the unit $P_1$ is light struck for current flow, there will be a voltage drop across $R_1$. This voltage will be applied across $R_2$ which is connected in series with the cell $P_2$. If the unit $P_2$ is light struck and conducting, the voltage will be dissipated across $R_2$ and $P_2$ and there will be no output voltage signal V. However, with the unit $P_1$ conducting and the unit $P_2$ not conducting, as will occur when a bottle proceeds top end first, there will be no voltage drop across $R_2$ and $P_2$ and there will be an output voltage signal for relay operation.

Obviously, it is desirable to move the bottles one at a time through the first discriminator station and in spaced relationship to the following bottle. It has been found that this can be accomplished by mounting an air line 74 and nozzle 76 over the track 30 in advance of the first discriminator station. Air is continuously directed through the adjustably supported nozzle 76 onto the bottles passing therebelow so as to thrust the leading bottle ahead of the other bottles and in spaced relationship thereto through the first discriminator station. The airstream hitting the side or an end of the foremost bottle will move it on ahead and through the discriminator unit, but it will soon be joined on the other side by the next bottle which has been similarly speeded up. When reaching the second discriminator station 22, a similarly arranged nozzle performs the same function.

After passing the first discriminator unit 20, the bottles traverse approximately 180° of the spiral track to the second discriminator unit 22. However, before reaching the second discriminating unit the bottles pass below a plate 78 which in all respects is like the previously mentioned plate 36 and which is utilized to thrust any bottles from the track which are not advancing endwise. That is, it is possible that a bottle will not be flipped as desired at the first discriminator station and such bottle might conceivably stand erect and advance along the track. The plate 78 will eliminate such bottles from the path of movement.

The second discriminator unit 22 comprises the same elements found at the first discriminator unit and the description thereof will not be repeated. In addition, a continuously operating air nozzle is located in advance of the second discriminator unit to move the bottles one at a time therethrough. The only difference to be found in the second discriminator unit when compared with the first is that a different nozzle arrangement is provided. That is, at the second discriminator unit only a single nozzle 80 (FIG. 7) is employed for operation in the event a bottle advances thereto top end first. The nozzle 80 is located in an appropriate aperture in the side wall of the track to direct the air stream across the track and inwardly thereof as shown so that it will engage and thrust the improperly oriented bottle inwardly and off the track toward the bottom of the bowl.

Thus, the bottles proceeding along the track from the second discriminator unit 22 will be advancing in single file order and in end to end relationship, bottom end first.

The bottles can pass rapidly along the track of the vibratory bowl and through the discriminator units because they can be erected and taken away by the further apparatus of this invention as rapidly as they approach the erecting chute 24. As shown in FIGS. 1, 2 and 8, the said chute is of generally rectangular cross section and open at both ends. It is supported on the base 10 and bracket 28 independently of the vibratory bowl 12, and it is not vibrated therewith. The open upper end of the chute 24 communicates with the top end 34 of the track 30 and it slopes downwardly and outwardly therefrom. As shown in FIG. 8, the chute has an attaching plate 82 for adjustably securing it to an L-shaped frame member 84 supported on the bracket 28 as by bolts 86, 86. Thus, the angular disposition of the chute can be adjusted within limits as desired.

While the bottles B,B can fall freely through the chute 24, it is desirable to speed up the operation by forcing them through the chute at an accelerated rate. This is accomplished by providing an air line 88 provided with a nozzle 90 adjacent the top end of the chute, the nozzle being directed downwardly to accelerate the fall of the bottles through the chute. Preferably, a continuous air stream is passed through the said nozzle.

A resilient platform indicated generally at 92 is located adjacent the open bottom end of the chute 24 to receive the bottles falling therethrough bottom end first. The preferred platform comprises a plate 94 having a pad 96 thereon which is engaged by the falling bottles and which is preferably made of cork or other resilient durable material. The plate 94 has a depending skirt for pivotally mounting the same on a pin 98 which extends horizontally from the bottom end of an adjustable support arm 100. Thus, when a bottle strikes the pad 96 as shown in FIG. 8, the plate 94 is permitted to pivot clockwise a limited distance so as to dampen and control the bounce of the bottle therefrom.

The means limiting the clockwise pivoting movement of the plate 94 comprises a vertical adjustable stop 102 which is threaded in a forwardly projecting portion 104 of a flange at the bottom end of the arm 100. An additional adjustable stop 106 is threaded into the rearwardly extending portion 108 of the said flange to engage the rearward portion of the plate 94 and limit the counter-clockwise pivoting or swinging movement of the said plate. Further adjustment is provided by means of a counterweight 110 which is adjustably secured to the plate 94 so that it can be moved forwardly and rearwardly to balance it in a desired attitude. The arm 100 is adjustably supported in a bracket 112 which itself is adjustably mounted for movement forwardly and rearwardly on the frame member 84.

As will be apparent from FIG. 8, the adjustable mounting for the resilient platform 92 is of relatively great magnitude. This is important to provide control of the bounce of the bottle as desired so that it can be caught while in an erect position and then removed from the vicinity of the chute and the bounce dampening platform. As seen in FIG. 8, the relative arrangement of the chute 24 and the platform 92 is such as to provide for a bottle falling through the chute to strike the pad 96 with the rear portion of its bottom edge. Then, the bottle will bounce forwardly and upwardly as controlled by the arrangement of the platform to approximately the dotted line position shown.

The bottle catching and conveying mechanism 26 includes a pair of endless belts 114, 114 which are arranged substantially parallel to each other to turn on vertical axes. More specifically, the belts 114, 114 are made of sponge rubber or other comparably soft and resilient material and they are arranged so that they will turn about axes over the platform 92 so that a bounced bottle can be caught between the adjacent substantially parallel portions of the said belts. The belts are driven by a chain drive 116 connected to an electric motor 118 supported at the side of the bracket 28, and the belt supporting shafts, etc. are arranged for relative adjustment. That is, the belts are supported so that the spacing between them can be varied by turning handles 120, 120 attached to lead screws, and the effective length of the belts can be adjusted by turning take-up screws or shafts 122, 122.

Preferably, while the adjacent portions of the belts 114, 114 are substantially or generally parallel, they nonetheless diverge slightly in the forward direction. Thus, as the bottles are carried forwardly away from the chute and platform between the belts and as the distance between the belts increases, the erect bottles are permitted to slip downwardly, bottom end first, as shown in FIG. 8. The bottles continue to slip downwardly until htey rest upon an endless conveyor belt 124 disposed between and below the two catching belts 114, 114.

As a result, the bottles are erected and then carried in single file order and sequence and deposited in such order and sequence on the belt 124 for transportation to a bottle filling machine or the like.

The invention claimed is:

1. A mechanism for orienting intermingled articles, such as bottles, in end to end relationship, said mechanism comprising a bowl having a spiral track therein leading from its bottom to its top for the articles to climb as a result of bowl vibration, means arranged along the track for engagement with the articles to assure their advance in single file end to end relationship, means capable of directing a force against an article on the track to turn it end for end, a light beam projector, and light beam sensitive actuating means operatively associated with said force directing means to actuate the same for application of force against an article only as a result of the article advancing along the track in undesired endwise orientation.

2. A mechanism for orienting intermingled articles, such as bottles, in end to end relationship, said mechanism comprising a bowl having a spiral track therein leading from its bottom for the articles to climb in end to end relationship as a result of bowl vibration, means capable of directing a stream of air against an article on the track to turn it end for end, a light beam projector, and light beam sensitive actuating means operatively associated with said air directing means to actuate the same to direct air against an article only as a result of the article advancing along the track in undesired endwise orientation.

3. A mechanism for orienting intermingled articles, such as plastic bottles, in end to end relationship, said mechanism comprising a bowl having a spiral track therein leading from its bottom for the articles to climb in end to end relationship as a result of bowl vibration, first nozzle means capable of directing a stream of air against an article on the track to turn it end for end, a first light beam projector, a first light beam sensitive actuating means operatively associated with said first nozzle means to actuate the same to direct air against an article only as a result of the article advancing along the track in undesired endwise orientation, a second nozzle means capable of directing a stream of air against an article on the track to return it to the bottom of the bowl, a second light beam projector, and a second light beam sensitive actuating means operatively associated with said second nozzle means to actuate the same to direct air against an article only as a result of the article passing said first nozzle means and advancing thereafter along the track in undesired endwise orientation.

4. A mechanism for orienting intermingled articles, such as plastic bottles, in end to end relationship, said mechanism comprising a bowl having a spiral track therein leading from its bottom for the articles to climb in end to end relationship as a result of bowl vibration; a first end-orienting station along said track comprising a pair of adjustable nozzles for directing air against an article to turn it end for end, means projecting light on passing articles at said first station, a light sensitive actuator in the track and operatively associated with said pair of nozzles to actuate the same to direct air against an article passing the station through the projected light in undesired endwise orientation; and a second end-orienting station along said track comprising an air nozzle for directing air against an article to return it to the bottom of the bowl, means projecting light on passing articles at said second station, and a light sensitive actuator in the track and operatively associated with said nozzle to actuate the same to direct air against an article reaching said second station and passing through the projected light there in undesired endwise orientation.

References Cited in the file of this patent
UNITED STATES PATENTS

| | | |
|---|---|---|
| 1,435,263 | Soubier | Nov. 14, 1922 |
| 2,734,616 | Schell | Feb. 14, 1956 |
| 2,908,376 | Sahugin | Oct. 13, 1959 |
| 2,915,165 | Bell | Dec. 1, 1959 |

UNITED STATES PATENT OFFICE
CERTIFICATE OF CORRECTION

Patent No. 3,101,832                                August 27, 1963

Charles Wyle et al.

It is hereby certified that error appears in the above numbered patent requiring correction and that the said Letters Patent should read as corrected below.

Column 2, line 50, for "where" read -- wherein --; column 5, line 9, after "Model #" insert -- A --; column 7, line 15, for "htey" read -- they --.

Signed and sealed this 11th day of February 1964.

(SEAL)
Attest:
ERNEST W. SWIDER                              EDWIN L. REYNOLDS

Attesting Officer                                Acting Commissioner of Patents